March 19, 1968 — O. L. KOLSTO — 3,374,064
OXYGEN ANALYZER
Filed May 20, 1963
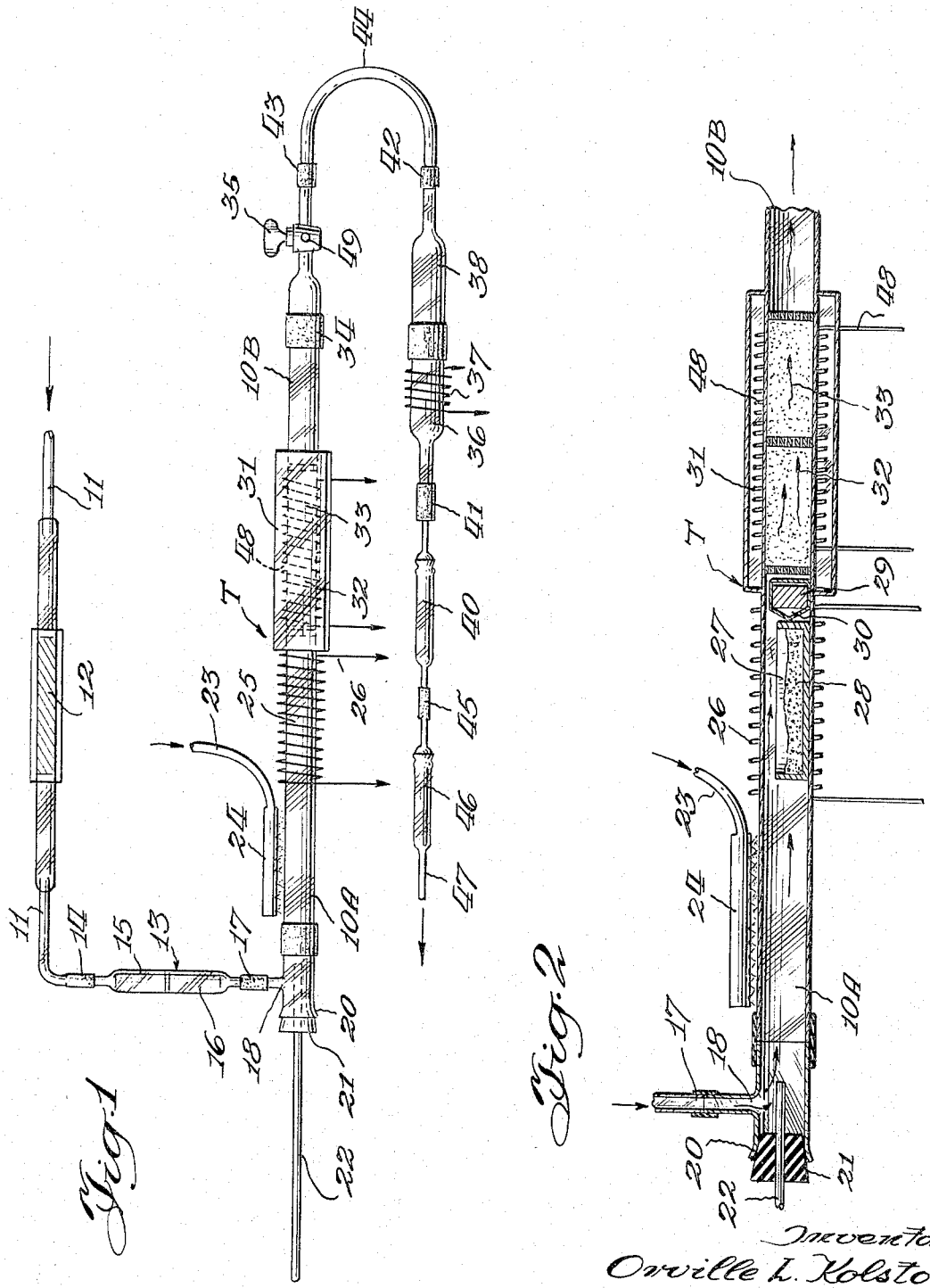
Inventor
Orville L. Kolsto
By Robert L. Niblack
Attorney United States Patent Office 3,374,064
Patented Mar. 19, 1968

3,374,064
OXYGEN ANALYZER
Orville L. Kolsto, Round Lake, Ill., assignor to Abbott Laboratories, North Chicago, Ill., a corporation of Illinois
Filed May 20, 1963, Ser. No. 281,542
2 Claims. (Cl. 23—253)

This invention relates to the quantitative determination of the oxygen content of materials. It particularly relates to a modified Unterzaucher-type pyrolysis method and apparatus for direct determination of oxygen in organic compounds.

Traditionally, the oxygen content of organic compounds has been determined by difference. That is, other substituents in a material being tested are quantitatively determined and the difference between their total and 100% is presumed to be oxygen. As this method has obvious disadvantages, being subject to a number of errors, a reliable method for a determination of oxygen is constantly being sought. Unterzaucher, J., Ber., 73B, 391 (1940), and others have suggested methods based on thermal decomposition of a test compound over carbon. These methods although generally satisfactory require minimum pyrolysis temperatures of 1120° C. to obtain quantitative results. These temperatures require use of elaborate furnaces and shorten the life of apparatus components.

An important object of this invention is to provide a method and suitable apparatus capable of utilizing substantially reduced pyrolysis and conversion temperatures in analyzing the oxygen content of organic compounds. Other advantages and objects will appear in the following specification.

In accordance with the above object this invention provides a method and apparatus requiring pyrolysis temperatures of less than 1000° C., thus making possible the use of less refined and longer-lived equipment. Broadly stated the method includes pyrolyzing a weighed sample of organic material in a closed pyrolysis tube in an atmosphere of high purity nitrogen gas at temperatures of from 920° to 1000° C.; partially converting the pyrolysis gases to carbon monoxide by contact with heated carbon; completing conversion to carbon monoxide in the heated platinized carbon; oxidizing the monoxide to carbon dioxide; collecting the dioxide and calculating the oxygen content by known methods.

Elemental carbon first used to convert pyrolysis gases to carbon monoxide should be of the class known as carbon blacks or lampblacks. Other types of carbon are less desirable for various reasons. Baked carbons being less reactive with pyrolysis gases, must be used in very large quantities or for unduly prolonged contact times to achieve quantitative conversion. Active carbons on the other hand are so reactive that they sometimes trap various pyrolysis products and release them upon saturation to give more variable analytical results than those experienced with lampblack carbons.

The platinized carbon used to complete the conversion to carbon monoxide is highly reactive and for this reason has been generally unsuitable for analytical use unless samples of an essentially nonoxygenacious nature are exclusively tested.

Although the platinum metal content of the platinized carbon may be varied rather widely the following is a suitable method for preparing "50%" platinized carbon reagent preferred in the practice of this invention. One unit, for example 10 gm., of platinum metal is dissolved in nitro-hydrochloric acid, commonly called aqua regia. The solution is evaporated to a slurry and an amount of carbon equal in weight to that of the platinum, again using the above example 10 gm., is mixed into the slurry. This mixture is diluted with water to about 1000 ml., evaporated to dryness, and the cake crushed to a coarse granulation.

In the accompanying drawings, forming a part of this specification, which depict a typical apparatus suitable for practicing the method of the invention
FIG. 1 is a side elevational view of an apparatus embodying the invention,
FIG. 2 is an enlarged fragmented longitudinal section of the pyrolysis tube.

Like references are used to designate components having like construction, function and relative position. Referring to the drawings wherein for the purposes of illustration is shown a preferred embodiment of the invention, the letter T designates a tubular pyrolysis body which is preferably circular in cross section and preferably composed of quartz. Tube T has a proximal end portion designated by numeral 10A and a distal end portion 10B.

In FIG. 1, a nitrogen gas tube 11 contains copper gauze unit 12. The nitrogen scrubber assembly 13 is coupled to gas tube 11 by coupling 14, all components preferably being circular in cross section. Carbon dioxide trap 15 and desiccator 16 are contained within the scrubber assembly. Trap 15 preferably contains an absorbent of the sodium hydroxide-asbestos type while desiccator 16 contains a dehydrating agent such as magnesium perchlorate. Coupling 17 connects the scrubber assembly to proximal gas inlet tube 18 and pyrolysis tube T.

Numeral 20 designates the proximal solid inlet which is closed by stopper 21, having rod 22 movably secured within it. Cooling fluid source tube 23 is connected to cooling manifold 24 provided with orifices facing and supportedly spaced from proximal end portion 10A of tube T.

The combustion chamber 25 is encased by combustion furnace 26 shown to take the form of a coil of high-resistance wire, preferably composed of Nichrome. Pyrolysis boat 27 depicted in a pyrolysis position within the combustion chamber is shown to contain test sample 28. A ferromagnetic pilot 30 is shown behind, that is at the distal side, of the boat. Pilot 30 has ferromagnetic material 29 sealed within it. An insulating jacket 31 covers main furnace 48 illustrated as a high-resistance wire coil, which encircles a first carbon chamber 32 packed with elemental carbon followed by a second carbon chamber 33 packed with platinized carbon. Preferably these chambers consist of quartz shells. If high-resistance electrical wire is employed in main furnace 48 it has been found that high-resistance alloy wires such as those sold under the mark Kanthal are longer-lived than the Nichrome wire preferably used elsewhere in the apparatus.

Coupling 34 connects pyrolysis tube T to the three-way stopcock assembly 35, having atmospheric exit port 49. A connector tube 44 joins by connectors 42 and 43 the stopcock assembly to acid trap 38. Tube 44 is depicted as being of extended length but it is preferably very short; and optimally stopcock 35 is directly attached to connector 42 as the train should be kept as short as possible for purposes of efficiency. Oxidizer unit 36 preferably containing copper oxide shown for example to have heater 37 wrapped around it as a helix is connected to acid trap 38 which contains a strong basic material such as potassium hydroxide in solid form. Desiccator tube 40 containing a dehydrating agent, preferably magnesium perchlorate, is attached to oxidizer 36 by coupling 41. The absorption tube 46 packed with carbon dioxide absorbent, preferably sodium hydroxide on asbestos such as that sold under the name Ascerite and a dehydrating agent preferably magnesium perchlorate such as that marketed under the name Anhydrone. The absorption tube 46 packed with carbon dioxide is open to the atmosphere at exit 47 and is removably connected to the train by coupling 45.

Throughout the specification and claims the term "communicating" is defined as any connection between components permitting gas interchange between them. All components along the entire train between the nitrogen gas tube 11 and exit 47 communicate with their adjacent tubular train components.

Operation of the illustrated embodiment is as follows. A nitrogen source attached to tube 11 supplied gas which passes through the copper gauze 12 to remove oxygen contained in the raw gas. The semi-purified nitrogen then passes through scrubber assembly 13, first through trap 15 containing a carbon dioxide absorbent and then through desiccator 16 to cause delivery of oxygen-free and water-free nitrogen into the pyrolysis tube T.

Initially in preparing the apparatus for an analysis, the entire train is assembled and swept for several hours with flowing nitrogen at elevated temperature, preferably about 920° C. Combustion furnace 26, heater 37 and main furnace 48 are adjusted to temperatures of about 920°, 350° and 920° C. respectively. As a general indication of suitable nitrogen flow, in a pyrolysis tube having a diameter for example of 10 mm. a flow of 18 to 25 ml. gas per minute is optimum.

The absorption tube 46 is removed at coupling 45 and weighed. The three-way stopcock is turned to block gas flow completely and cause a nitrogen back pressure. Stopper 21 is removed and the empty sample boat 27 is removed while the nitrogen back flow prevents air from being introduced into the tube. The weighed boat containing sample 28 is placed in the tube and stopper 21 is replaced to close the proximal solid inlet 20. The boat is kept behind the combustion chamber 25 in the vicinity of 10A and cooled by cooling fluid, preferably air, supplied through tube 23 through manifold assembly 24 until ready for burning. Such cooling prevents initial volatilizing of the sample during the time the apparatus is being closed and swept clear of any oxygen which may have been introduced with the sample.

The three-way stopcock is turned so that nitrogen flows through outlet valve 49 into the atmosphere, not over acid trap 38. The cooled sample boat is swept by nitrogen while the absorption tube 46 is being weighed. The absorption tube 46 is replaced after weighing, the stopcock is turned to cause nitrogen flow through tube 44 while sealing exit 49, and the boat is pushed forward with rod 22 into the combustion chamber 25 that is maintained at a temperature of between 750° to 1000° throughout pyrolysis. Pyrolysis gases are pushed by the flowing nitrogen into the first carbon chamber 32 which is of sufficient capacity to cause a majority portion of the gases to be converted to carbon monoxide. At a carbon temperature of 940° C. about a 95% conversion of pyrolysis gases to carbon monoxide is normally achieved. It is important that both the first and second carbon packings be maintained at a temperature of about 920° to 1000° C. during conversion. The partially converted gases then pass to chamber 33 containing the heated platinized carbon which converts the remaining unconverted pyrolysis gas to the monoxide. The carbon monoxide passes to tube 38 which traps any acidic vapors in the gases. The carbon monoxide progresses through oxidizer tube 36 maintained at temperatures between about 350° and 500° C. causing reduction of the copper oxide contained in it to metallic copper and conversion of the gas to carbon dioxide. The carbon dioxide continues through desiccator 40 which removes any moisture, and into absorption tube 46 which retains the carbon dioxide and allows nitrogen to be exhausted by exit 47 into the atmosphere. Absorption tube 46 is then removed at coupling 45 and weighed as a final analysis step.

A magnet is brought close to the exterior wall of the combustion chamber to cause its attraction by ferromagnetic pilot 30. Movement of the magnet toward inlet 20 causes boat 27 to be pushed toward the exit. This provides convenient means for removing the empty boat without requiring the introduction of objects such as wires into the pyrolysis tube.

The difference in weight between the absorption tube originally and after absorption of the carbon dioxide sample gas may be used to calculate oxygen by the following formula:

$$\text{oxygen factor} = \frac{\text{atomic weight oxygen}}{\text{molecular weight } CO_2} = \frac{16.00}{44.01} = 36.36$$

$$\text{percent oxygen} = \frac{\text{weight in mg. } CO_2 \times \text{oxygen factor}}{\text{sample weight}}$$

It is highly desirable to run a blank determination to eliminate errors probably caused by absorbed air in the system, slow breakdown of components from heat, and chemical reactions occurring during combustion of samples. The blank is run by placing an empty boat into the pyrolysis tube and following the complete normal analysis procedure. The formula for calculating oxygen would then be $$\text{percent oxygen} = 36.36 \frac{(CO_2 \text{ weight} - CO_2 \text{ weight from blank})}{\text{sample weight}}$$

While in the foregoing specification various preferred embodiments have been described and shown in detail, no unnecessary limitation should be understood therefrom as it will be appreciated by those skilled in the art of chemical analysis that this invention is susceptible to variation without departing from the spirit and scope thereof.

I claim:

1. In an apparatus for analyzing the oxygen content of chemical compounds a closed tubing having a proximal solid inlet, a proximal gas inlet and a distal gas outlet, a combustion chamber within the tubing communicating with the inlets, means for heating the combustion chamber, a first carbon chamber communicating with the combustion chamber and distally located therefrom, a second carbon chamber located between and communicating with said first chamber and the gas outlet, said first chamber containing elemental carbon and said second chamber containing platinized carbon, means for heating the carbon chambers, means for cooling the proximal portion of the tubing between the solid inlet and the combustion chamber, and a ferromagnetic pilot within the proximal portion of said tubing freely movable therein between and in direct horizontal alignment with the solid inlet and the first carbon chamber.

2. In an analytical apparatus for determining the oxygen content of organic compounds the combination comprising: a pyrolysis tube having a proximal inlet for introduction of solids, a proximally located gas inlet, and a distal gas outlet; a combustion chamber within a middle portion of the tube communicating with the inlets; a furnace in fixed relation to the combustion chamber adapted to maintaining interior chamber temperatures of about 1000° C.; a manifold assembly without the tube positioned and adapted to introducing cooling fluids on an exterior portion of the tube proximal to said combustion chamber; a first carbon chamber distal to and communicating with the combustion chamber packed with a lampblack; a second carbon chamber communicating with said first chamber packed with platinized carbon comprising about 50% platinum metal; a heater associated with the carbon chambers adapted to maintaining interior temperatures of about 1000° C.; an oxidation chamber adapted to and communicating with the distal outlet and equipped with a heater adapted to maintaining an interior temperature of up to about 500° C., said chamber containing copper oxide; and an absorption tube removably connected to the apparatus, communicating with said oxidation chamber and containing a carbon dioxide absorbent.

References Cited

UNITED STATES PATENTS 2,795,132   6/1957   Boehme et al. _____ 23—253

OTHER REFERENCES

Henkel et al.: Anal. Chem., vol. 25, No. 3, March 1953, pp. 470–479.

Oita et al.: Anal. Chem., vol. 26, No. 3, March 1954, pp. 600–602.

JAMES H. TAYMAN, *Primary Examiner.*

MORRIS O. WOLK, *Examiner.*